United States Patent
Gauci et al.

(10) Patent No.: US 11,554,733 B2
(45) Date of Patent: Jan. 17, 2023

(54) VEHICLE BODY SHIELD

(71) Applicant: Lund, Inc., Buford, GA (US)

(72) Inventors: Jason Gauci, Cumming, GA (US); Carlos Gutierrez, Norwalk, CA (US)

(73) Assignee: Lund, Inc., Buford, GA (US)

( * ) Notice: Subject to any disclaimer, the term of this patent is extended or adjusted under 35 U.S.C. 154(b) by 0 days.

(21) Appl. No.: 17/547,805

(22) Filed: Dec. 10, 2021

(65) Prior Publication Data

US 2022/0111811 A1 Apr. 14, 2022

Related U.S. Application Data

(63) Continuation of application No. 16/600,913, filed on Oct. 14, 2019, now Pat. No. 11,225,213.

(60) Provisional application No. 62/751,477, filed on Oct. 26, 2018.

(51) Int. Cl.
| | | |
|---|---|---|
| *B60R 19/50* | (2006.01) | |
| *B62D 25/12* | (2006.01) | |
| *B60Q 1/18* | (2006.01) | |
| *B60R 19/24* | (2006.01) | |

(52) U.S. Cl.
CPC ............ *B60R 19/50* (2013.01); *B60Q 1/18* (2013.01); *B60R 19/24* (2013.01); *B62D 25/12* (2013.01); *B60R 2019/505* (2013.01)

(58) Field of Classification Search
CPC ............ B60R 19/50; B60R 19/54; B60R 2019/505; B62D 25/10; B62D 25/12; B62D 35/005; B60Q 1/18
See application file for complete search history.

(56) References Cited

U.S. PATENT DOCUMENTS

| | | |
|---|---|---|
| D23,794 S | 11/1894 | Marks |
| D50,345 S | 2/1917 | Green |
| D50,346 S | 2/1917 | Green |

(Continued)

FOREIGN PATENT DOCUMENTS

| | | |
|---|---|---|
| CA | 64701 | 11/1899 |
| CA | 76555 | 7/1902 |

(Continued)

OTHER PUBLICATIONS

Bushwacker, "Bushwacker 10063-07 Jeep Flat Style Fender Flare—Rear Pair," Amazon.com, published Jun. 15, 2010 (retrieved from the internet Sep. 9, 2019). Internet URL:<https://www.amazon.com/dp/B004BZLA22/ref+psdc_15709431_t1_B003S6GSQI> (Year: 2010).

(Continued)

*Primary Examiner* — Gregory A Blankenship
(74) *Attorney, Agent, or Firm* — William H. Honaker; Dickinson Wright PLLC

(57) ABSTRACT

Disclosed herein are embodiments of a vehicle body shield having a light mount. The vehicle body shield can protect portions of a vehicle from damage when the vehicle is in motion and also provide illumination to regions around or in front of a vehicle via light sources supported by the light mount. The vehicle body shield can have a protection surface facing away from the vehicle, an attachment surface facing towards the vehicle, and a light mount extending upward from at least a portion of the attachment surface and between first and second ends of the vehicle body shield.

20 Claims, 6 Drawing Sheets

(56) References Cited

U.S. PATENT DOCUMENTS

| | | |
|---|---|---|
| 1,453,340 A | 5/1923 | Druar |
| 1,588,654 A | 6/1926 | Brownlee |
| 1,787,035 A | 12/1930 | Davis |
| 1,811,527 A | 6/1931 | Young |
| D85,241 S | 9/1931 | Henderson |
| 1,825,192 A | 9/1931 | Mace |
| 2,054,538 A | 9/1936 | Graves et al. |
| 2,059,305 A | 11/1936 | Best |
| 2,073,159 A | 3/1937 | Lintern et al. |
| 2,106,418 A | 1/1938 | Wagner |
| 2,184,798 A | 12/1939 | Gracey |
| 2,236,846 A | 4/1941 | Davisson |
| 2,281,840 A | 5/1942 | Hamilton |
| 2,475,901 A | 7/1949 | Kipp |
| D154,735 S | 8/1949 | Airbib |
| D154,861 S | 8/1949 | Maher |
| D156,679 S | 12/1949 | Stiles |
| D157,555 S | 3/1950 | Abrams |
| D159,144 S | 6/1950 | Dieterich |
| 2,534,763 A | 12/1950 | Flavin |
| 2,566,934 A | 9/1951 | Dieterich |
| 2,567,501 A | 9/1951 | Zeis |
| 2,599,809 A | 6/1952 | Branch |
| D167,676 S | 9/1952 | Chicorel |
| 2,749,830 A | 6/1956 | Landon |
| 2,757,954 A | 8/1956 | Hurley |
| 2,777,732 A | 1/1957 | Walsh |
| 2,792,254 A | 5/1957 | Hagglund |
| 2,793,705 A | 5/1957 | Garrity |
| 2,857,973 A | 10/1958 | Garrity |
| 2,859,680 A | 11/1958 | Edwards |
| 2,949,842 A | 8/1960 | Crandall |
| 3,015,517 A | 1/1962 | Thornburgh |
| 3,022,848 A | 2/1962 | Bennett |
| D201,496 S | 6/1965 | Stef |
| 3,214,216 A | 10/1965 | Brown, Jr. |
| 3,434,408 A | 3/1969 | Rivers |
| 3,487,420 A | 12/1969 | Herr |
| 3,678,635 A | 7/1972 | Vagi et al. |
| 3,695,674 A | 10/1972 | Baker |
| 3,728,537 A | 4/1973 | Barenyi et al. |
| 3,736,404 A | 5/1973 | Eisler |
| 3,785,699 A | 1/1974 | Molaskey |
| 3,815,700 A | 6/1974 | Mittendorf |
| 3,866,524 A | 2/1975 | Forbes, Jr. |
| 3,866,527 A | 2/1975 | Katris |
| D239,705 S | 4/1976 | Lund |
| 3,987,863 A | 10/1976 | Mittendorf |
| 4,018,472 A | 4/1977 | Mason, Jr. |
| 4,039,221 A | 8/1977 | Eady |
| 4,040,656 A | 8/1977 | Clenet |
| 4,043,587 A | 8/1977 | Giallourakis |
| 4,052,099 A | 10/1977 | Lowery et al. |
| 4,063,773 A | 12/1977 | Modesette |
| 4,089,256 A | 5/1978 | Furcini |
| 4,099,760 A | 7/1978 | Mascotte |
| 4,149,749 A | 4/1979 | Canal |
| 4,153,129 A | 5/1979 | Redmond |
| 4,159,845 A | 7/1979 | Bratsberg |
| D252,680 S | 8/1979 | Kingsley et al. |
| 4,169,608 A | 10/1979 | Logan |
| 4,174,021 A | 11/1979 | Barlock |
| 4,174,850 A | 11/1979 | Hart |
| 4,178,034 A | 12/1979 | Mittendorf |
| 4,191,097 A | 3/1980 | Groen |
| 4,219,870 A | 8/1980 | Haraden et al. |
| D256,793 S | 9/1980 | Logan |
| 4,262,954 A | 4/1981 | Thompson |
| D259,873 S | 7/1981 | Milner |
| D261,500 S | 10/1981 | Butler |
| 4,309,056 A | 1/1982 | Long |
| 4,320,919 A | 3/1982 | Butler |
| D264,833 S | 6/1982 | Trombley et al. |
| 4,347,781 A | 9/1982 | Hassell |
| 4,364,591 A | 12/1982 | Bien |
| 4,412,698 A | 11/1983 | Kingsley |
| D272,429 S | 1/1984 | Trombley et al. |
| 4,423,668 A | 1/1984 | Long |
| D273,672 S | 5/1984 | Lund |
| 4,447,067 A | 5/1984 | Yamashita |
| 4,471,991 A | 9/1984 | Matthias |
| 4,476,774 A | 10/1984 | Liberto et al. |
| 4,493,577 A | 1/1985 | Cosenza |
| 4,527,466 A | 7/1985 | Kossor et al. |
| 4,547,013 A | 10/1985 | McDaniel |
| D283,120 S | 3/1986 | Trombley et al. |
| D283,611 S | 4/1986 | Kingsley |
| 4,592,937 A | 6/1986 | Nagata et al. |
| D284,565 S | 7/1986 | Trombley et al. |
| 4,605,238 A | 8/1986 | Arenhold |
| 4,621,824 A | 11/1986 | Arenhold |
| 4,627,657 A | 12/1986 | Daniels et al. |
| D288,309 S | 2/1987 | Lund |
| D288,310 S | 2/1987 | Lund |
| 4,671,552 A | 6/1987 | Anderson et al. |
| D291,295 S | 8/1987 | Lund |
| 4,685,718 A | 8/1987 | Steenblik et al. |
| 4,700,980 A | 10/1987 | Josefczak |
| 4,707,014 A | 11/1987 | Rich |
| 4,709,938 A | 12/1987 | Ward et al. |
| 4,726,619 A | 2/1988 | Haugestad |
| D294,707 S | 3/1988 | Cameron |
| 4,750,549 A | 6/1988 | Ziegler et al. |
| 4,756,242 A | 7/1988 | Keith |
| 4,758,040 A | 7/1988 | Kingsley |
| 4,776,627 A | 10/1988 | Hutto |
| 4,784,430 A | 11/1988 | Biermacher |
| D299,713 S | 2/1989 | Dunham |
| 4,819,136 A | 4/1989 | Ramsey |
| D300,918 S | 5/1989 | Turner |
| D301,028 S | 5/1989 | Buck |
| D301,450 S | 6/1989 | Kingsley |
| 4,842,319 A | 6/1989 | Ziegler et al. |
| 4,842,320 A | 6/1989 | Kingsley |
| 4,842,912 A | 6/1989 | Hutter, III |
| 4,844,529 A | 7/1989 | O'Saben |
| D304,437 S | 11/1989 | Eash |
| D304,819 S | 11/1989 | Chapman et al. |
| 4,904,014 A | 2/1990 | Azarovitz et al. |
| 4,923,241 A | 5/1990 | Miller |
| 4,929,013 A | 5/1990 | Eke |
| 4,966,404 A | 10/1990 | Lund |
| D312,238 S | 11/1990 | Lund |
| D319,209 S | 8/1991 | Miller |
| 5,042,551 A | 8/1991 | Ein et al. |
| 5,048,868 A | 9/1991 | Arenhold |
| 5,067,760 A | 11/1991 | Moore |
| 5,082,321 A | 1/1992 | Brewer |
| 5,112,095 A | 5/1992 | Lund et al. |
| 5,114,205 A | 5/1992 | Jee |
| D326,636 S | 6/1992 | Barth |
| 5,120,082 A | 6/1992 | Ito |
| 5,130,906 A | 7/1992 | Lund |
| 5,150,941 A | 9/1992 | Silzer et al. |
| 5,183,303 A | 2/1993 | Zoller |
| 5,215,343 A | 6/1993 | Fortune |
| 5,234,247 A | 8/1993 | Pacer |
| 5,238,268 A | 8/1993 | Logan |
| 5,251,953 A | 10/1993 | Willey |
| 5,280,386 A | 1/1994 | Johnson et al. |
| 5,284,376 A | 2/1994 | Zweigart |
| 5,308,134 A | 5/1994 | Stanesic |
| D348,242 S | 6/1994 | Tsao |
| 5,320,461 A | 6/1994 | Stanesic |
| 5,340,154 A | 8/1994 | Scott |
| 5,348,363 A | 9/1994 | Fink |
| 5,353,571 A | 10/1994 | Berdan et al. |
| D352,491 S | 11/1994 | Galasso |
| 5,403,059 A | 4/1995 | Turner |
| 5,456,786 A | 10/1995 | Cook et al. |
| 5,460,425 A | 10/1995 | Stephens |
| 5,475,956 A | 12/1995 | Agrawal et al. |
| 5,522,634 A | 6/1996 | Stanesic et al. |
| D375,068 S | 10/1996 | Lund |

(56) References Cited

U.S. PATENT DOCUMENTS

| | | |
|---|---|---|
| 5,595,416 A | 1/1997 | Horwill |
| 5,613,710 A | 3/1997 | Waner |
| D379,956 S | 6/1997 | Baughman |
| 5,636,892 A | 6/1997 | Gordon |
| 5,651,566 A | 7/1997 | Arenhold |
| D382,239 S | 8/1997 | Logan et al. |
| 5,660,428 A | 8/1997 | Catlin |
| 5,664,871 A | 9/1997 | Thompson |
| 5,676,418 A | 10/1997 | Strefling |
| 5,683,293 A | 11/1997 | Mohammed |
| 5,697,644 A | 12/1997 | Loga et al. |
| 5,718,283 A | 2/1998 | Naty et al. |
| 5,722,690 A | 3/1998 | Ward et al. |
| 5,755,483 A | 5/1998 | Lund |
| D395,365 S | 6/1998 | Verbeek et al. |
| D395,421 S | 6/1998 | Gable et al. |
| 5,791,719 A | 8/1998 | Alley |
| 5,797,645 A | 8/1998 | Schenk et al. |
| 5,823,553 A | 10/1998 | Thompson |
| 5,829,786 A | 11/1998 | Dahl |
| 5,851,044 A | 12/1998 | Lund |
| D403,639 S | 1/1999 | Gale et al. |
| D404,698 S | 1/1999 | Schenk et al. |
| 5,925,425 A | 7/1999 | Nelson |
| 5,879,045 A | 9/1999 | Logan |
| D415,354 S | 10/1999 | Horwill et al. |
| 5,984,401 A | 11/1999 | Hannah |
| 5,988,305 A | 11/1999 | Sakai et al. |
| 6,019,414 A | 2/2000 | Pourciau, Sr. |
| 6,027,156 A | 2/2000 | Lund et al. |
| 6,042,473 A | 3/2000 | McClary |
| D422,541 S | 4/2000 | Richter |
| D424,495 S | 5/2000 | Damon et al. |
| D424,496 S | 5/2000 | Damon et al. |
| 6,070,908 A | 6/2000 | Skrzypchak |
| 6,099,064 A | 8/2000 | Lund |
| 6,099,065 A | 8/2000 | Lund |
| D431,511 S | 10/2000 | Damon et al. |
| D432,476 S | 10/2000 | Damon et al. |
| 6,131,681 A | 10/2000 | Nelson et al. |
| D436,335 S | 1/2001 | Beigel |
| 6,193,278 B1 | 2/2001 | Ward et al. |
| D438,495 S | 3/2001 | Bobo |
| 6,205,642 B1 | 3/2001 | Czirmer |
| 6,350,195 B1 | 2/2002 | Iino |
| 6,460,914 B2 | 10/2002 | Gille et al. |
| D467,018 S | 12/2002 | Shih et al. |
| 6,511,109 B1 | 1/2003 | Schultz et al. |
| D472,655 S | 4/2003 | Lin |
| 6,547,305 B1 | 4/2003 | Ellis |
| 6,547,306 B2 | 4/2003 | Espinose et al. |
| 6,551,540 B1 | 4/2003 | Porter |
| 6,557,927 B2 | 5/2003 | Kanie |
| D478,303 S | 8/2003 | Iverson et al. |
| D478,538 S | 8/2003 | Iverson et al. |
| D482,992 S | 12/2003 | Hattori et al. |
| D483,312 S | 12/2003 | Saleen |
| 6,682,126 B2 | 1/2004 | Kanie |
| D488,751 S | 4/2004 | Szczesny |
| 6,722,730 B2 | 4/2004 | Lydan et al. |
| D490,176 S | 5/2004 | Lin |
| 6,736,353 B1 | 5/2004 | Erben |
| D491,858 S | 6/2004 | Velazco |
| 6,752,446 B2 | 6/2004 | Espinose et al. |
| 6,805,389 B1 | 10/2004 | Schellenberg |
| 6,810,950 B1 | 11/2004 | Manze, III |
| 6,830,119 B2 | 12/2004 | Whitworth |
| 6,854,545 B2 | 2/2005 | Elwell |
| 6,910,316 B2 | 6/2005 | Espinose et al. |
| 6,959,948 B2 | 11/2005 | Varnhagen et al. |
| D516,481 S | 3/2006 | Metros et al. |
| D517,965 S | 3/2006 | Metros et al. |
| 7,028,797 B2 | 4/2006 | White |
| 7,029,051 B2 | 4/2006 | Espinose et al. |
| 7,036,873 B2 | 5/2006 | Pommeret et al. |
| 7,044,524 B2 | 5/2006 | Luetze et al. |
| D522,427 S | 6/2006 | Beigel et al. |
| 7,114,749 B2 | 10/2006 | Ward |
| 7,131,683 B1 | 11/2006 | Gong |
| D533,810 S | 12/2006 | Metsugi et al. |
| D533,820 S | 12/2006 | Sonoda et al. |
| 7,144,075 B2 | 12/2006 | Shishikura |
| 7,156,452 B2 | 1/2007 | Schumacher et al. |
| 7,166,350 B2 | 1/2007 | Murayama |
| D536,809 S | 2/2007 | James |
| 7,172,240 B1 | 2/2007 | Kaufman |
| D539,710 S | 4/2007 | Kouyama |
| 7,204,543 B2 | 4/2007 | Mishimaji |
| 7,222,884 B2 | 5/2007 | Callan et al. |
| D545,253 S | 6/2007 | Jones |
| 7,232,246 B2 | 6/2007 | Kleber et al. |
| D546,253 S | 7/2007 | Lee et al. |
| D546,935 S | 7/2007 | Arrowood |
| 7,246,842 B2 | 7/2007 | Yamada |
| D548,660 S | 8/2007 | Jenkins |
| D556,657 S | 12/2007 | Elwell et al. |
| D564,414 S | 3/2008 | Okue |
| D564,425 S | 3/2008 | Okue |
| 7,377,564 B1 | 5/2008 | Baffy et al. |
| D570,509 S | 6/2008 | Logan |
| D570,754 S | 6/2008 | Kim et al. |
| D580,328 S | 11/2008 | Jones |
| D582,825 S | 12/2008 | Logan |
| D586,270 S | 2/2009 | Suga et al. |
| D590,756 S | 4/2009 | Williams et al. |
| D591,654 S | 5/2009 | Williams et al. |
| D591,655 S | 5/2009 | Golden et al. |
| D591,656 S | 5/2009 | Golden et al. |
| D591,657 S | 5/2009 | Golden et al. |
| D591,658 S | 5/2009 | Golden et al. |
| 7,537,253 B2 | 5/2009 | Rosen et al. |
| 7,578,527 B2 | 8/2009 | Iverson et al. |
| 7,589,622 B2 * | 9/2009 | Farley ............... B60Q 1/2615 340/471 |
| D608,546 S | 1/2010 | Dicker et al. |
| D610,511 S | 2/2010 | Dubanowski et al. |
| 7,717,467 B2 | 5/2010 | Iverson |
| 7,762,876 B2 | 7/2010 | McClary |
| 7,766,356 B2 | 8/2010 | Iverson |
| D623,103 S | 9/2010 | Braga |
| 7,857,352 B2 | 12/2010 | Logan |
| D644,972 S | 9/2011 | Beigel et al. |
| 8,061,747 B2 | 11/2011 | Shoup et al. |
| 8,118,329 B2 | 2/2012 | Braga |
| 8,127,501 B2 | 3/2012 | Nakao |
| 8,147,300 B2 | 4/2012 | Lunghofer |
| 8,360,500 B2 | 1/2013 | Mishimagi |
| 8,382,193 B2 | 2/2013 | Ezaka |
| D688,611 S | 8/2013 | Liao |
| D688,612 S | 8/2013 | Liao |
| D695,171 S | 12/2013 | Riggs et al. |
| D699,169 S | 2/2014 | Waclawski et al. |
| 8,651,554 B1 | 2/2014 | Patelczyk et al. |
| D704,614 S | 5/2014 | Larson |
| D707,164 S | 6/2014 | Lee |
| D712,324 S | 9/2014 | McFarlin et al. |
| 8,998,290 B2 | 4/2015 | Serentill et al. |
| 9,121,426 B2 | 9/2015 | Jagoda |
| D744,385 S | 12/2015 | Harriton |
| 9,272,605 B1 | 3/2016 | Gong |
| 9,302,639 B2 | 4/2016 | Patelczyk |
| D762,147 S | 7/2016 | Messale et al. |
| D763,754 S | 8/2016 | Sanders et al. |
| D765,569 S | 9/2016 | Hall et al. |
| D778,795 S | 2/2017 | Johns et al. |
| 9,616,945 B1 | 4/2017 | Henderson et al. |
| 9,630,481 B2 | 4/2017 | Rose et al. |
| 9,650,005 B2 | 5/2017 | Patelczyk et al. |
| D792,822 S | 7/2017 | Platto et al. |
| D795,767 S | 8/2017 | Platto et al. |
| D795,768 S | 8/2017 | Platto et al. |
| D801,896 S | 11/2017 | Ito et al. |
| 9,834,161 B2 | 12/2017 | Mettler |
| 9,878,600 B2 | 1/2018 | Rose et al. |

(56) References Cited

U.S. PATENT DOCUMENTS

| | | |
|---|---|---|
| D814,354 S | 4/2018 | Fisker |
| 10,081,322 B2 | 9/2018 | Patelczyk et al. |
| 10,166,844 B2 | 1/2019 | Rose et al. |
| D839,806 S | 2/2019 | Chi |
| D841,549 S | 2/2019 | Hopkins |
| 10,266,038 B2 | 4/2019 | Serentill et al. |
| D851,001 S | 6/2019 | Guo |
| D855,519 S | 8/2019 | Bundy et al. |
| D856,878 S | 8/2019 | Harriton et al. |
| D857,571 S | 8/2019 | Harriton et al. |
| D858,385 S | 9/2019 | Phillips |
| D858,386 S | 9/2019 | Wymore et al. |
| D860,082 S | 9/2019 | Poyorena et al. |
| D860,083 S | 9/2019 | Poyorena et al. |
| D861,561 S | 10/2019 | Mallicote et al. |
| D863,159 S | 10/2019 | Goodrich et al. |
| D867,245 S | 11/2019 | Ito et al. |
| D870,620 S | 12/2019 | Hallgren |
| D875,006 S | 2/2020 | DiCanzio |
| 10,611,215 B2 | 4/2020 | Rose et al. |
| 10,625,696 B2 | 4/2020 | Crismon |
| D883,156 S | 5/2020 | Joudo |
| 10,647,280 B2 | 5/2020 | Patelczyk et al. |
| 10,675,953 B2 | 6/2020 | Serentill et al. |
| D898,640 S | 10/2020 | Rose |
| D906,200 S | 12/2020 | Bibb, VI |
| D906,202 S | 12/2020 | Bibb, VI |
| D910,516 S | 2/2021 | Radbrink |
| D935,966 S | 11/2021 | Bibb, VI |
| 11,225,213 B2 * | 1/2022 | Gauci .................. B62D 25/12 |
| 2001/0040383 A1 | 11/2001 | Lund et al. |
| 2002/0158460 A1 | 10/2002 | Logan |
| 2003/0178870 A1 | 9/2003 | Angelo et al. |
| 2003/0178879 A1 | 9/2003 | Uramichi |
| 2004/0006855 A1 | 1/2004 | Kinzel |
| 2005/0217911 A1 | 10/2005 | Cheng |
| 2005/0275212 A1 | 12/2005 | Angelaitis |
| 2006/0049663 A1 | 3/2006 | Kodama et al. |
| 2006/0181088 A1 | 8/2006 | Cobble et al. |
| 2006/0226678 A1 | 10/2006 | Chang |
| 2008/0217958 A1 | 9/2008 | Banry et al. |
| 2008/0311349 A1 | 12/2008 | Johnson |
| 2010/0007169 A1 | 1/2010 | Nguyen |
| 2012/0073767 A1 | 3/2012 | Graziano |
| 2012/0144648 A1 | 6/2012 | Iwamoto |
| 2012/0205941 A1 | 8/2012 | Chou |
| 2013/0270870 A1 * | 10/2013 | O'Brien .................. B62D 25/10 296/193.11 |
| 2014/0125046 A1 | 5/2014 | Yen |
| 2015/0021937 A1 | 1/2015 | Perez |
| 2016/0001640 A1 | 1/2016 | Serentill et al. |
| 2016/0144902 A1 | 5/2016 | Avalos Sartorio et al. |
| 2016/0280278 A1 | 9/2016 | Jaynes |
| 2016/0280281 A1 | 9/2016 | Dyck et al. |
| 2017/0021786 A1 | 1/2017 | Lee |
| 2018/0118142 A1 | 5/2018 | Wymore |
| 2018/0229646 A1 | 8/2018 | Van Buren et al. |
| 2018/0272961 A1 | 9/2018 | Gust |
| 2019/0126991 A1 | 5/2019 | Wymore et al. |
| 2019/0233020 A1 | 8/2019 | Frederick et al. |
| 2019/0276091 A1 | 9/2019 | Higgs |
| 2020/0130479 A1 | 4/2020 | Rose |
| 2020/0130565 A1 * | 4/2020 | Lanini .................. B60Q 1/2696 |
| 2020/0130621 A1 | 4/2020 | Gauci |
| 2020/0398647 A1 | 12/2020 | Serentill et al. |

FOREIGN PATENT DOCUMENTS

| | | |
|---|---|---|
| CA | 2819150 | 10/2019 |
| CN | 304219598 | 7/2017 |
| CN | 304219599 | 7/2017 |
| CN | 304219600 | 7/2017 |
| CN | 304292499 | 9/2017 |
| DE | 3932142 | 4/1990 |
| DE | 3843803 | 7/1990 |
| EP | 0447640 | 9/1991 |
| FR | 1067336 | 6/1954 |
| FR | 1096819 | 6/1955 |
| FR | 1121035 | 7/1956 |
| GB | 734743 | 8/1955 |
| GB | 829154 | 2/1960 |
| GB | 2046183 | 11/1980 |
| JP | 61-057471 | 3/1986 |
| JP | 63-130479 | 6/1988 |
| JP | 2000-296738 | 10/2000 |
| JP | D1163501 | 1/2003 |
| JP | 2010-149758 | 7/2010 |
| JP | 2013-091427 | 4/2015 |
| JP | 2013-147169 | 3/2016 |

OTHER PUBLICATIONS

Bushwacker, "Bushwacker 10064-07 Jeep Flat Style Fender Flare—Rear Pair," Amazon.com, published Jun. 15, 2010 (retrieved from the internet Sep. 9, 2019). Internet URL:<https://www.amazon.com/Bushwacker-10064-07-Style-Fender-Flare/dp/B003S6GSQI> (Year:2010).

Bushwacker gives SEMA Show attendees chance to vote on fender flare concepts https://www.searchautoparts.com/aftermarket-business/news-distribution/bushwacker-gives-sema-show-attendees-chance-vote-fender-flare Posted Nov. 7, 2018 (Year:2018).

Jayerouth, "Xenon Fender Flares Installed," JK-Forum.com, published Nov. 18, 2007 (Retrieved from the Internet Jun. 3, 2020). Internet URL: <https://www.jk-forum.comforums/jk-show-tell-33/xenon-fender-flares-installed-20927/> (Year: 2007).

"Jeep Wrangler JK Snyper Tubular Fender Flares—Textured Black (2007-2018) Review & Install," ExtremeTerrain.com. YouTube, published Jul. 12, 2018 (Retreived from the Internet Jun. 3, 2020). Internet URL:<https://www.youtube.com/watch?v=_IPiCfdiq4>(Year: 2018).

"JK Rear Crusher Flares," Poison Spyder Customs, published Aug. 16, 2017 (Retrieved from the Internet Jun. 3, 2020). Internet URL: <https//web.archive.org/web/20170816033721/https://shop.poisonspyder.com/JK-Rear_Crusher-Flares-Extra-Wide-Steel-p/17-05-020.htm>(Year: 2017).

2007 Toyota Camry SE Road Test, Barry Windfield, Mar. 2006, Car and Driver http://caranddriver.com/reviews/2007-toyota-camry-se-road-test.

* cited by examiner

VEHICLE BODY SHIELD

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

This disclosure generally relates to vehicle body shields configured to protect a portion of a vehicle, such as the front end of a vehicle (e.g., hood or grille) or a portion of the roof of a vehicle. More specifically, this disclosure relates to vehicle body shields having light mounts configured to support one or more light sources for illuminating regions around or in front of a vehicle.

Description of the Related Art

Vehicle body shields have been developed to protect a vehicle from contact with road debris, bugs, and to deflect airflow away from windshields. These devices are also commonly referred to as bug shields or airflow deflectors. One example of a vehicle body shield is that described in U.S. Pat. No. 9,878,600, which is hereby incorporated by reference in its entirety.

SUMMARY

Disclosed herein are embodiments of a vehicle body shield for use on a vehicle. In some embodiments, the vehicle comprises a main body. The main body can comprise: a first end and a second end opposite the first end; a protection surface facing away from the vehicle; and an attachment surface facing towards the vehicle. The main body can be configured to form a light mount extending upward from at least a portion of the attachment surface of the main body and between the first and second ends of the main body. The light mount can define a mounting space for a light source configured to illuminate a region in front of the vehicle. In some embodiments, the light mount comprises at least one of: a pair of side flanges; a top flange and a bottom flange; and a back face spaced rearward from the surrounding protection surface, the back face configured to secure a portion of the light source. The vehicle body shield can further comprise a light source secured to the light mount.

In some embodiments, the attachment surface comprises at least one adhesive tape section extending along a portion of the attachment surface and configured to secure to a portion of the vehicle. The at least one adhesive tape section of the attachment surface can be configured to secure to a hood of the vehicle.

In some embodiments, the vehicle body shield further comprises an attachment clip configured to attach the vehicle body shield to a hood of the vehicle.

In some embodiments, the light mount extends generally vertically upward from the attachment surface a first height, wherein the first height is no greater than 10% of a distance between a roof of the vehicle and a hood of the vehicle so as to not interfere with driver visibility. In some embodiments, the vehicle body shield further comprises a light source, wherein at least a portion of the light source comprises LEDs. In some embodiments, a portion of the main body of the vehicle body shield wraps around a front edge of a hood of the vehicle. In some embodiments, the main body of the vehicle body shield wraps around at least one side edge of a hood of the vehicle.

In some embodiments, the light mount comprises an opening configured to allow a power cable to pass therethrough, wherein the power cable is configured to electronically couple the light source to a parking light of the vehicle. In some embodiments, the opening is located in one of a pair of side flanges of the light mount. In some embodiments, the light mount extends at least 50% of a maximum length of the main body between the first and second ends.

In some embodiments, a vehicle body shield for use on a vehicle comprises: a first end and a second end opposite the first end; a protection surface facing away from the vehicle; and an attachment surface facing towards the vehicle. The vehicle body shield can be configured to form a light mount extending upward from at least a portion of the attachment surface and between the first and second ends of the vehicle body shield, wherein the light mount defines a mounting space for a light source configured to illuminate a region nearby the vehicle.

In some embodiments, the vehicle body shield further comprises a main body, wherein the light mount of the vehicle body shield is integrally formed with the main body. The light mount of the vehicle body shield can comprise at least one of: a pair of side flanges configured to secure ends of the light source; a top flange and a bottom flange, the top and bottom flanges configured to secure sides of the light source; and a back face spaced rearward from the surrounding protection surface, the back face configured to secure a side of the light source. The vehicle body shield can further comprise a light source secured to the light mount. The light source can comprise LEDs. The light source can comprise a power source independent of a battery of the vehicle. The independent power source can be stored within a space between a hood and the vehicle body shield.

In some embodiments, the attachment surface comprises at least one adhesive tape section extending along a portion of the attachment surface and configured to secure to a portion of the vehicle. The at least one adhesive tape section of the attachment surface can be configured to secure to a hood of the vehicle.

In some embodiments, the vehicle body shield further comprises an attachment clip configured to attach the vehicle body shield to a hood of the vehicle.

In some embodiments, the light mount extends generally vertically upward from the attachment surface a first height, wherein the first height is no greater than 10% of a distance between a roof of the vehicle and a hood of the vehicle so as to not interfere with driver visibility.

In some embodiments, a portion of the vehicle body shield is configured to wrap around a front edge of a hood of the vehicle. In some embodiments, a portion of the vehicle body shield is configured to wrap around at least one side edge of a hood of the vehicle.

In some embodiments, the light mount comprises an opening configured to allow a power cable to pass therethrough, wherein the power cable is configured to electronically couple the light source to a parking light of the vehicle. In some embodiments, the light mount extends at least 50% of a maximum length of the vehicle body shield between the first and second ends.

In some embodiments, a vehicle body shield for use on a vehicle comprises: a first end and a second end opposite the first end; a protection surface facing away from the vehicle;

and an attachment surface facing towards the vehicle; wherein the vehicle body shield is configured to form a light mount extending upward from at least a portion of the attachment surface and between the first and second ends of the vehicle body shield, the light mount defining a mounting space for a light source configured to illuminate a region nearby the vehicle. In some embodiments, the vehicle body shield further comprises a main body, wherein the light mount of the vehicle body shield is integrally formed with the main body. In some embodiments, the light mount comprises: a pair of side flanges; a top flange and a bottom flange oriented transverse with respect to the pair of side flanges; and a back face spaced rearward from the surrounding protection surface and oriented transverse with respect to the top and bottom flanges. In some embodiments, the vehicle body shield further comprises a light source secured to the light mount. In some embodiments, the light source comprises a light strip including a first surface and a second surface including one or more LEDs, wherein the first surface is configured to secure to the back face of the light mount. In some embodiments, the first surface of the light strip comprises an adhesive and a release liner disposed over the adhesive and configured for removal prior to securement of the light strip to the back face of the light mount. In some embodiments, the light mount comprises an opening in one of the pair of side flanges, the opening configured to allow a power cable to pass therethrough, the power cable configured to electronically couple the light strip to a parking light of the vehicle.

DETAILED DESCRIPTION

Figure 1:
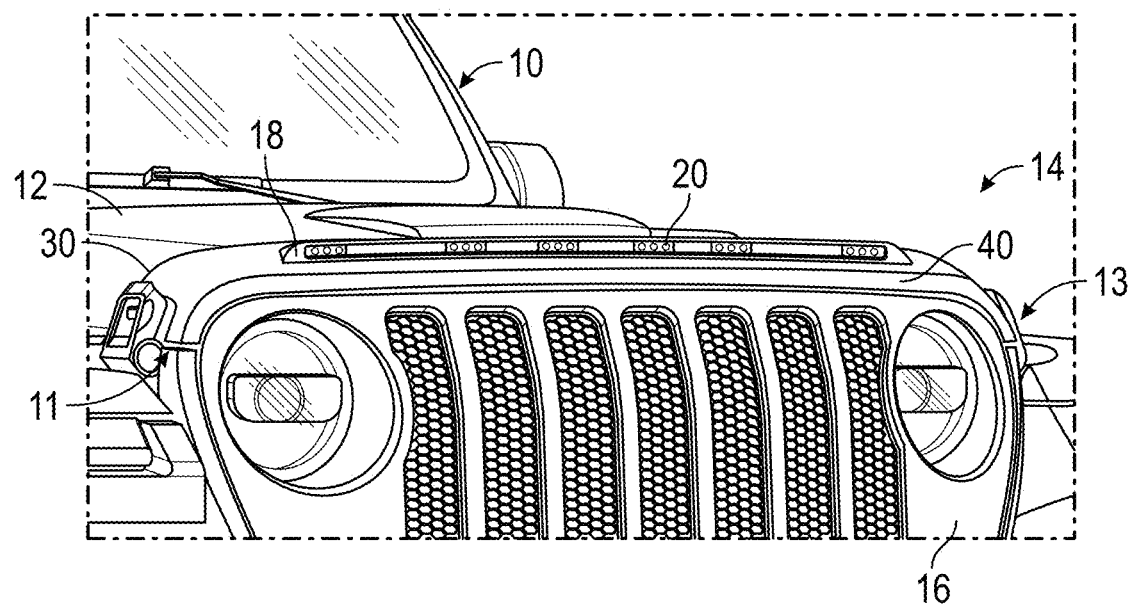
FIG. 1 illustrates a perspective view of an embodiment of a vehicle body shield attached to a vehicle.

Disclosed herein are embodiments of a vehicle body shield that can be used on a number of different vehicles to provide protection, aesthetic improvements to the vehicles, and/or to provide additional illumination to areas in front of and/or around the vehicle with a light mount. The term "vehicles," as used herein, can include cars, trucks, SUVs, and vans though the particular type of vehicle does not limit the disclosure. Further, embodiments of the disclosed body shields can be used interchangeably with different types of vehicles, or can be designed specifically for a certain make and/or model of vehicle. As an example, the vehicle body shield can be specifically used for a Chevy Silverado or a Jeep Wrangler.

Vehicle body shields can protect portions of vehicles from contact with road debris, bugs, and other objects when the vehicle is in motion. Further, vehicle body shields can deflect airflow away from windshields. The vehicle body shields described herein can additionally include light mounts configured to secure one or more light sources. The light sources can provide illumination additional to or as an alternative to illumination provided by vehicle lights (such as parking lights). Such light mounts can include one or more openings which can allow cables to electronically couple the light sources to a power source of the vehicle. For example, the light sources contained within the light mounts can be connected to the vehicles parking lights. Advantageously, where the vehicle body shields are installed on a hood of a vehicle, the light mounts of the vehicle body shields can extend a height that is less than a certain percentage of the distance between a roof and the hood. This can ensure that the light mount does not interfere with a driver's ability to see beyond the light mount to an area in front of the vehicle.

As used herein, a "hood" or "vehicle hood" is the hinged cover over the engine of a vehicle that allows access to the engine compartment. As used herein, the "grille" or "front grille" of a vehicle is the portion of the front of a vehicle that covers an opening in the body of a vehicle and that allows air to enter or pass therethrough. As used herein, a "roof" or "cab roof" is the portion of a vehicle that sits above the passenger compartment that protects the occupants from sun, wind, rain, and other external elements.

While the present disclosure may illustrate and/or discuss embodiments of vehicle body shields attached to a hood of a vehicle, the disclosure is not limited to such contexts. For example, the vehicle body shields discussed herein can be attached to other portions of vehicles, such as on roofs of vehicles or on portions of grilles of vehicles.

Various features, components, and installation techniques of vehicle body shields are described in U.S. Pat. No. 9,878,600, which is hereby incorporated by reference in its entirety. Such features, components, and installation techniques can be applicable in some, many, or all respects to the vehicle body shields discussed herein.

FIG. 1 illustrates an embodiment of a vehicle body shield 14 attached to a hood 12 of a vehicle 10. The vehicle body shield 14 can have a main body including a protection surface which faces away from the hood 12 of the vehicle 10 and an attachment surface (similar to attachment surfaces 130 and 230 shown in FIGS. 2B and 3B) which faces toward the hood 12 of the vehicle 10. The vehicle body shield 14 can attach to the vehicle 10 (such as the hood 12 of the vehicle 10) as shown and/or as described in U.S. Pat. No. 9,878,600, which is hereby incorporated by reference in its entirety. For example, the attachment surface can have one or more adhesive tape sections extending along a portion of the attachment surface and configured to secure to a portion of the hood 12 of the vehicle 10.

As shown, the vehicle body shield 14 can be attached to a front portion of the hood 12 and can partially wrap around a leading edge of the hood 12. As also shown, the vehicle body shield 14 can have ends 11, 13 which extend from one side of the hood 12 to an opposite side of the hood 12. The ends 11, 13 of the vehicle body shield 14 can wrap around portions of the sides of the hood 12 (see FIG. 1). While the vehicle body shield 14 is shown as attached to and/or wrapping around the hood 12, one of skill in the art will recognize that the vehicle body shield 14 can be attached to a portion of a front grille 16 of the vehicle 10, as discussed above.

Figure 2A:
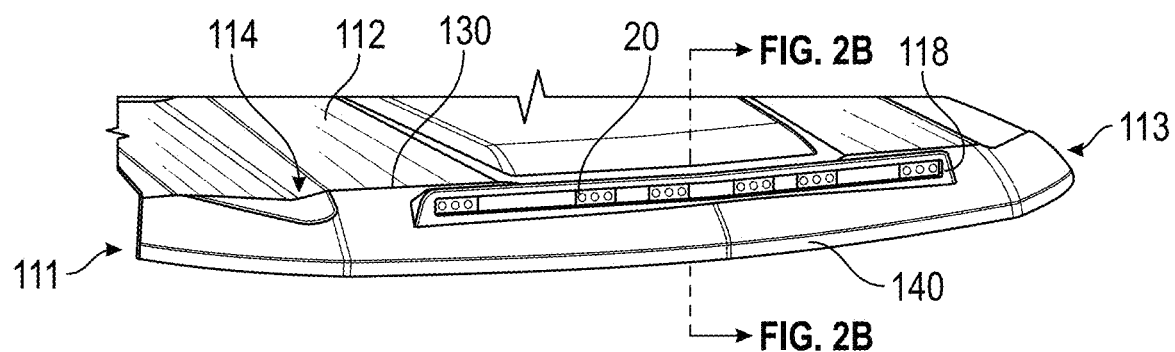
FIG. 2A illustrates a perspective view of another embodiment of a vehicle body shield attached to a vehicle.

FIG. 2A illustrates a vehicle body shield 114 which is the same in many respects as vehicle body shield 14. One difference between vehicle body shield 114 and vehicle body shield 14 is that vehicle body shield 114 fits vehicle hoods 112 which do not have sides like those of hood 12. FIG. 2A illustrates a vehicle body shield 114 with a light mount 118 without also showing a light source (such as light source 20) mounted therein.

As shown in FIGS. 1 and 2A and as discussed above, the vehicle body shields discussed herein (such as vehicle body shields 14, 114) can be sized and/or shaped to conform to the shape of various portions of vehicles, such as hoods 12, 112 of vehicles.

Vehicle body shields 14, 114 can be configured to form light mounts 18, 118. Light mounts 18, 118 can extend upward from a portion of the attachment surface and comprise a recess or cut out in the protection surface and can further extend between the first ends 11, 111 and second ends 13, 113 of the vehicle body shields 14, 114. As discussed herein, the light mounts 18, 118 can define a mounting space for a light source which can illuminate a region nearby the vehicle, such as in front of the vehicle 10. The mounting space defined by the light mounts 18, 118 can be of a variety of different forms and/or configurations in order to receive and/or secure light sources 20. A "light source," as used herein, can be a light bar, a light strip, or another type of light source which can illuminate an area. Light mounts 18, 118 can be located in various regions of the vehicle body shields 14, 114. As shown by FIGS. 1 and 2A, the light mounts 18, 118 can be spaced inward from a leading edge 40, 140 of the vehicle body shields 14, 114 and/or can be spaced inward from a trailing edge 30, 130 of the vehicle body shields 14, 114.

Figure 2B:
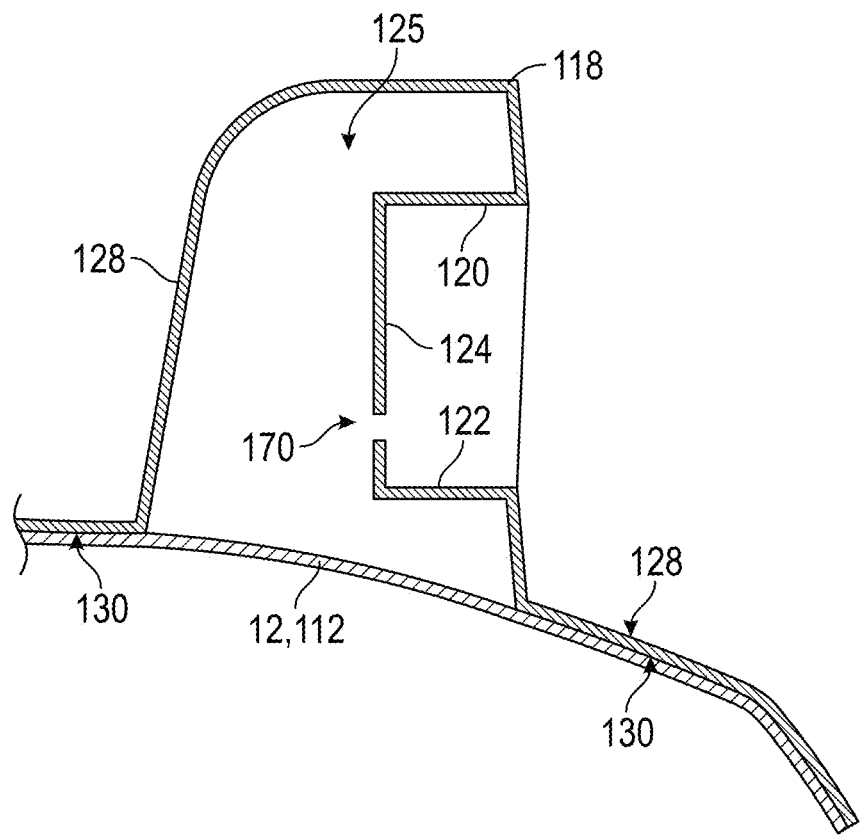
FIG. 2B illustrates a cross-section of the embodiment of the vehicle body shield of FIG. 2A.

FIG. 2B illustrates a cross-section of the vehicle body shield 114, and more particularly, of the light mount 118. As shown, the light mount 118 can take on various forms so as to receive and/or secure one or more light sources (such as light source 20). In some cases, the light mount 118 is sized and/or shaped to receive a light bar which can have a rectangular, circular, square or other shape or cross-section and which is configured to illuminate nearby areas. In some cases, the light mount 118 is sized and/or shaped to receive a light strip which can be secured (e.g., adhered) to a portion of the light mount 118 (e.g., the back face) and which is configured to illuminate nearby areas. The light mount 118 can include a top flange 120 and/or a bottom flange 122 which can secure sides of the light source (e.g., where the light source is a light bar). Additionally or alternatively, the light mount 118 can include a pair of side flanges positioned near ends of the light mount 118 which can secure ends of the light source (for example, where the light source is a light bar). Such side flanges can be oriented so that they are generally perpendicular to the orientation of the top flange 120 and/or bottom flange 122 that is showing in FIG. 2B. Such side flanges can be oriented so that surfaces of the ends of the light source (such as a light bar 20) are generally parallel with planes of the side flanges. The light bar 20 is not shown for clarity, but it will be understood that it may fill the recess defined by the light mount 118 (e.g., defined by the side flanges, top flange, back flange, and back face 124 of light mount 118) and have a front face which is flush with the front of the side flanges and the front of the top and bottom flanges 120, 122. The light mount 118 can include a back face 124 configured to secure a side of the light source. As discussed above, a light source, such as a light strip, can be secured (e.g., adhered) to the back face 124. The back face 124 can be spaced rearward from the surrounding protection surface 128. For example, the back face 124 can be recessed from the surrounding protection surface 128.

As discussed above, FIG. 2B illustrates a cross-section of the vehicle body shield 114 through the light mount 118. As also discussed above and shown in FIG. 2B, the vehicle body shield 114 can be attached to a hood 112 of a vehicle 10 via attachment surface(s) 130. The protection surface 124 of the vehicle body shield 114 is also illustrated in FIG. 2B. In some embodiments, the attachment surface 130 and/or the protection surface 124 of the vehicle body shield 114 are sized and/or shaped to conform to the surface of a hood or other portion of the vehicle to which they are attached.

As discussed herein, a light source (such as light source 20) can be secured to and/or within the light mount 118. The light source can be a light bar or a light strip, or another type of light source that can illuminate a region. The light source can include LEDs, for example. The light source can include one, two, three, four, five, six, seven, eight, nine, or ten or more LEDs. The light source(s) of light mount 118 can be powered independently of the power source of the vehicle to which they are attached. Alternatively, the light source(s) of the light mount 118 can be powered by connecting to a power source of the vehicle, such as the battery of the vehicle 10. In some embodiments, the light source(s) of the light mount 118 can be electronically coupled to a power source of the vehicle and can also have an independent power source which can act as a back-up power source and/or can be utilized if the vehicle power is disabled (e.g., the vehicle is off).

To facilitate electrical connection of the light source(s) to a power source of the vehicle, light mount 118 can have one or more openings 170 (see FIG. 2B) configured to allow a power cable to pass therethrough. For example, the power cable can connect to the light source(s) within the light mount 118, pass through an opening in the light mount 118, pass through a hole in the vehicle (such as a hole in a hood of the vehicle) and connect to the battery of the vehicle. Such hole can be drilled into the hood 112 or can be a pre-existing holes or opening in the hood 112 as occurs in some vehicles, such as jeeps. Where the vehicle body shield 114 is attached to a roof of the vehicle, such hole can be on a portion of the roof under or nearby the opening of the light mount 118 and a power cable can run from the light source through the roof and into the cab of the vehicle. In some embodiments, the light source of the light mount 118 can be configured to electronically couple to the parking lights of the vehicle. The one or more openings (or pre-formed holes) in the light mount 118 can be located at a variety of locations. For example, where the light mount 118 includes one or more side flanges, top flanges 120, bottom flanges 122, and/or back faces 124, the one or more openings can be positioned on a portion of any of these. As another example, some embodiments of the light mount 118 do not have a back face 124, and, in such embodiments, wiring connected to the light source(s) secured to the light mount 118 can be passed through an opening in the protection surface 128 where the back face 124 appears in FIG. 2B. As another example, some embodiments of the light mount 118 do not have side flanges, and, in such embodiments, wiring connected to the light source(s) secured to the light mount 118 can be passed through an opening in the protection surface 128 where such side flanges could be. As another example, some embodiments of the light mount 118 do not have top flange 120 and/or a bottom flange 122, and, in such embodiments, wiring connected to the light source(s) secured to the light mount 118 can be passed through an opening in the protection surface 128 where either of the top or bottom flanges 120, 122 appear in FIG. 2B. As another example, and with reference to FIG. 2A, some embodiments of the light mount 118 include an opening on one or more of the side flanges of light mount 118 (for example, in a surface of a side flange that faces a direction parallel to a length of the light mount 118, the recess that can be defined by the light mount 118, and/or an opposing side flange of the light mount 118). In such configurations, an electrical wire connected to the light source (such as an end of the light source) can pass through an opening in one of the side flanges of light mount 118, pass under a portion of the vehicle body shield 114 and wrap under an edge of the hood 112 of the vehicle, for example a leading edge of the hood 112. In some embodiments, the vehicle body shield 114 includes a lip that sticks out passed such edge of the hood 112 and hides the portion of the wiring that wraps around and underneath the hood 112. Such electrical wire can be spliced into the parking or fog lights of the vehicle, for example. In some embodiments, the light mount 118 can be turned on and/or off with a toggle switch.

As discussed above, the light source(s) of light mount 118 can be powered independently of the power source of the vehicle to which they are attached. For example, the light source(s) secured to the light mount 118 can be connected to and powered by an independent power source, such as a battery. Such independent power source can be housed within a space 125 between the hood 112 and the vehicle body shield 114 (see FIG. 2b).

As discussed above, the light mount 118 can extend upward from a portion of the vehicle body shield 114. For example, the light mount 118 can extend upward (such as vertically upward) from the attachment surface 130 and can extend between ends of the vehicle body shield 114. The light mount 118 can extend above the vehicle body shield 114 a maximum height so that the light mount 118 does not interfere with driver visibility of a region in front of the vehicle. For example, where the vehicle body shield 114 is mounted on a hood 112, of a vehicle and a driver is positioned in the driver's seat, the driver will need to be able to see portions of the road in front of the vehicle when the vehicle is in motion. Keeping the height of the light mount 118 of the vehicle body shield 114 within a certain percentage of a distance between the hood 112 and the driver' eye height can ensure that the light mount 118 does not interfere with such driver visibility. In some embodiments, the height of the light mount 118 above the hood 112 is less than a certain percentage of a distance between the hood 112 and a roof of the vehicle. For example, the height of the light mount 118 above the hood 112 can be less than 30% of a distance between the hood 112 and a roof of the vehicle 10. As another example, the height of the light mount 118 above the hood 112 can be less than 25%, 20%, 15%, 10%, or 5% of a distance between the hood 112 and a roof of the vehicle.

As shown in FIGS. 1 and 2A, the vehicle body shields 14, 114 can have a first end 11, 111 and a second end 13, 113. Further, as discussed above, the light mount 18, 118 can extend upward from the attachment surface of the vehicle body shield 14, 114 and can extend between the first end 11, 111 and second end 13, 113 of the vehicle body shield 14, 114. The light mount 18, 118 can extend along the vehicle body shield 14, 114 a given length that is a certain percentage of a length of the vehicle body shield 14, 114 between the first end 11, 111 and second end 13, 113. For example, the light mount 18, 118 can extend along the vehicle body shield 14, 114 a length that is at least 10%, 20%, 30%, 40%, 50%, 60%, or 70% of a length of the vehicle body shield 14, 114 between the first end 11, 111 and second end 13, 113. As another example, the light mount 18, 118 can extend along the vehicle body shield 14, 114 a length that is no more than 30%, 40%, 50%, 60%, 70%, 80%, or 90% of a length of the vehicle body shield 14, 114 between the first end 11, 111 and second end 13, 113. Greater extension of the light mount 18, 118 along a length of the vehicle body shield 14, 114 can allow larger size (e.g., length) light sources, which can in turn provide more illumination to regions in front and/or nearby the vehicle body shield 14, 114.

In some embodiments, the vehicle body shield 14, 114 further comprises an attachment clip configured to attach the vehicle body shield to a hood of the vehicle. Such attachment clips are described in U.S. Pat. No. 9,878,600, which is hereby incorporated by reference in its entirety.

Figure 3A:
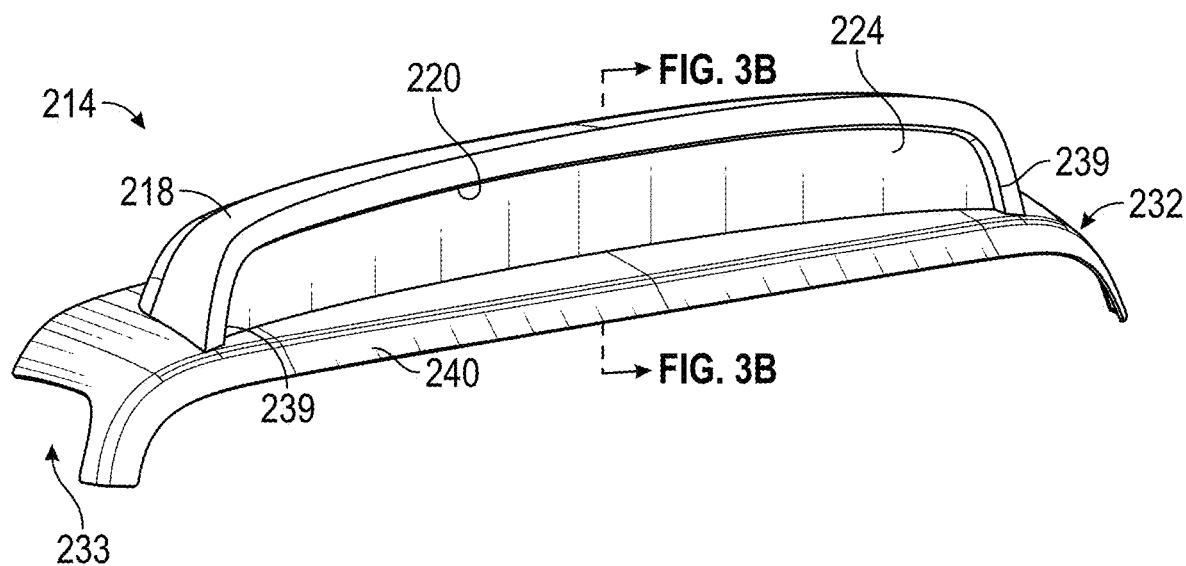
FIG. 3A illustrates a perspective view of another embodiment of a vehicle body shield.

As discussed above, the vehicle body shield 14, 114 can be attached to a roof of a vehicle. When attached to the roof, the vehicle body shield 14, 114 can cover and/or rest upon the roof and/or a portion of a windshield of the vehicle. For example, the vehicle body shield 14, 114 can be secured to a leading portion of the roof and/or a trailing (upper) portion of a windshield using the adhesive and/or mechanical methods and/or techniques discussed herein and/or in U.S. Pat. No. 9,878,600. In some embodiments, when the vehicle body shield 14, 114 is secured to a leading portion of the roof, a portion of the vehicle body shield 14, 114 rests overtop, but does not adhere to, a trailing (upper) portion of the windshield. Other configurations and/or placement locations of the vehicle body shield 14, 114 on a roof of a vehicle are contemplated by the disclosure. [0047] FIGS. 3A-3D illustrate another embodiment of a vehicle body shield 214. Vehicle body shield 214 can be similar in some or many respects as vehicle body shields 14, 114. FIGS. 3A and 3C illustrate front perspective views of the vehicle body shield 214 and FIG. 3D illustrates a back perspective view of vehicle body shield 214. Vehicle body shield 214 can be configured to attach to a hood of a vehicle, a roof of a vehicle, and/or another portion of a vehicle. The vehicle body shield 214 can have a main body including a protection surface 228 which faces away from the hood of the vehicle and an attachment surface 230 which faces toward the hood 12, 112 of a vehicle (see FIG. 3B). The vehicle body shield 214 can attach to a vehicle as shown and/or described in U.S. Pat. No. 9,878,600. For example, the attachment surface 230 can have one or more adhesive tape sections extending along a portion of the attachment surface 230 and configured to secure to a portion of the hood 12, 112 of a vehicle.

The vehicle body shield 214 can be attached to a front portion of the hood 12, 112 and can partially wrap around a leading edge of the hood 12, 112. For example, a front portion 240 of vehicle body shield 214 can wrap around a leading edge of a hood 12, 112. The vehicle body shield 214 can have arms located at ends 233, 232 which extend over sides and/or the front portion of a vehicle (see FIGS. 3A and 3C). Similar to as that discussed with respect to the vehicle body shields 14, 114, the vehicle body shield 214 can be sized and/or shaped to conform to the shape of various portions of vehicles, such as hoods 12, 112 of vehicles or roofs of vehicles.

Vehicle body shield 214 can be configured to form a light mount 218, as shown in FIGS. 3A-3D. Light mount 218 can extend from a portion of the attachment surface 230 and can extend between first and second ends 233, 232 of the vehicle body shield 214. As discussed herein, the light mount 218 can define a mounting space for a light source which can illuminate a region nearby the vehicle, such as in front of the vehicle. The mounting space defined by the light mount 218 can be of a variety of different forms and/or configurations in order to receive and/or secure light sources. Further, light mount 218 can be located in various regions of the vehicle body shield 214. As shown by FIGS. 3A and 3C, the light mount 218 can be spaced inward from a front portion 240 of the vehicle body shield 214 and/or can be spaced inward from a back portion 231 of the vehicle body shield 214.

Figure 3B:
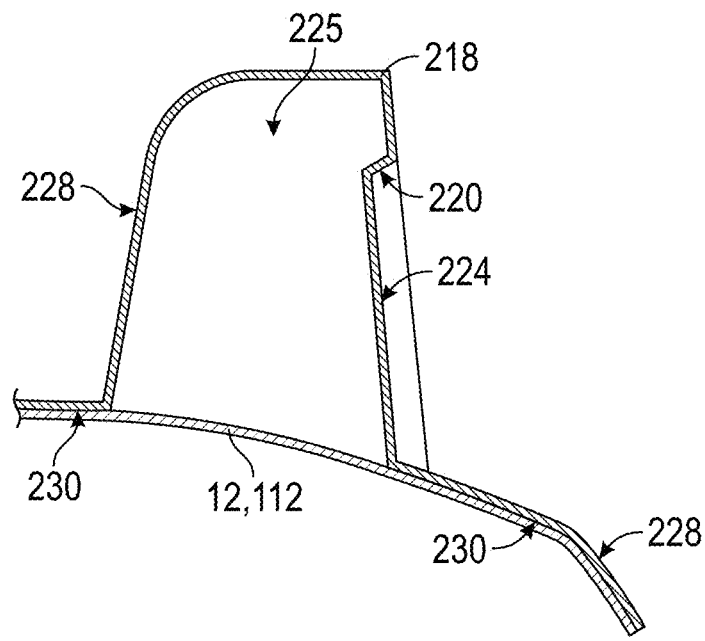
FIG. 3B illustrates a cross-section of the embodiment of the vehicle body shield of FIG. 3A.
Figure 3C:
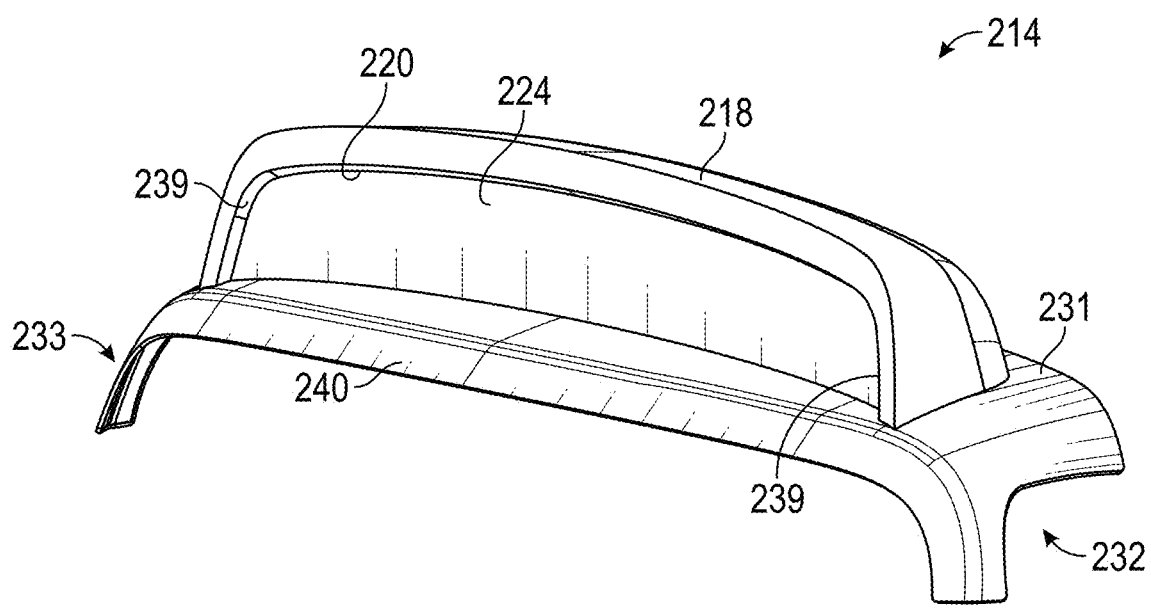
FIG. 3C illustrates another perspective view of the embodiment of the vehicle body shield of FIG. 3A.
Figure 3D:
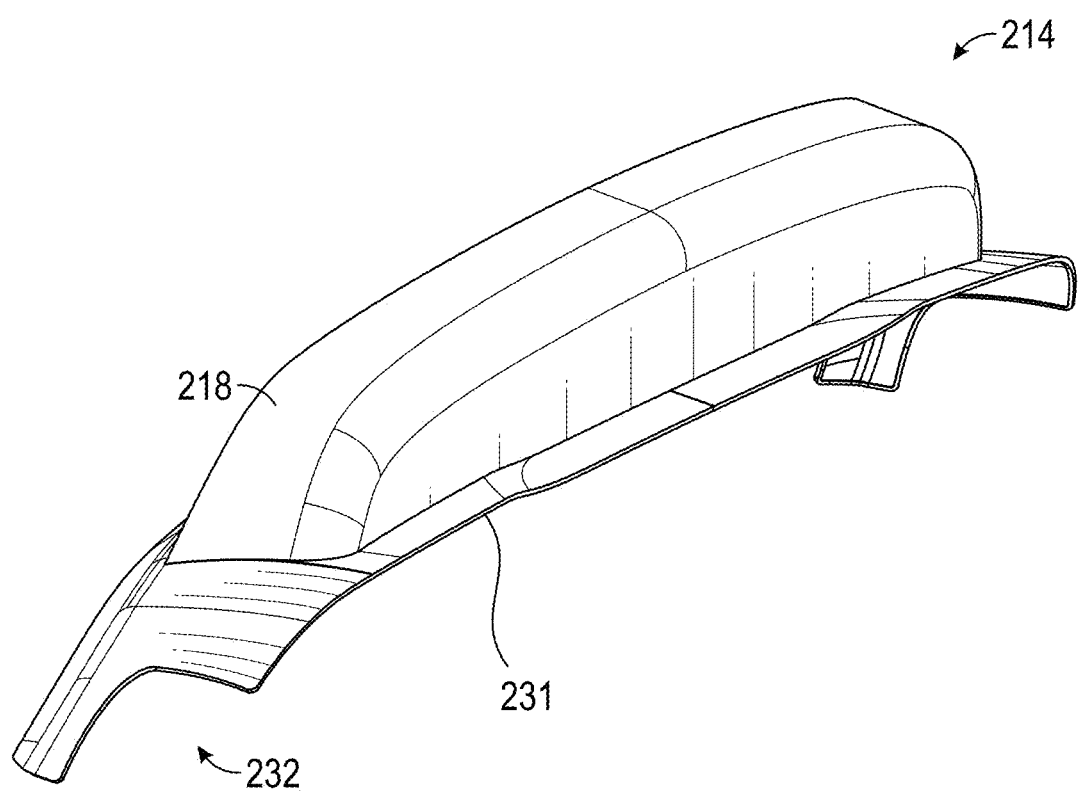
FIG. 3D illustrates another perspective view of the embodiment of the vehicle body shield of FIG. 3A.

FIG. 3B illustrates a cross-section of the light mount 218. As shown, the light mount 218 can take various forms so as to receive and/or secure one or more light sources. For example, the light mount 218 can include a top flange 220 which can secure a side or other portion of the light source. Additionally or alternatively, the light mount 218 can include a pair of side flanges 239 (see FIGS. 3A and 3C) positioned near ends of the light mount 218 which can secure ends of the light source. Such side flanges 239 can be oriented so that they are generally perpendicular to orientation of the top flange 220 as that shown in FIG. 3B. Such side flanges 239 can be oriented so that surfaces of the ends of the light source are generally parallel with planes of the side flanges 239. In some embodiments, the light mount 218 includes a back face 224 configured to secure a side of the light source. The back face 224 can be spaced rearward from the surrounding protection surface 228. For example, the back face 224 can be recessed from the surrounding protection surface 228.

As discussed above, FIG. 3B illustrates a cross-section of the vehicle body shield 214 through the light mount 218. As shown in FIG. 3B, the vehicle body shield 214 can be attached to a hood 12, 112 of a vehicle 10 via attachment surface(s) 230. The protection surface 228 of the vehicle body shield 214 is also illustrated in FIG. 3B. In some embodiments, the attachment surface 230 and/or the protection surface 228 of the vehicle body shield 214 are sized and/or shaped to conform to the surface of a hood or other portion of the vehicle to which they are attached.

As discussed herein, a light source (or a plurality of light sources) can be secured to and/or within the light mount 218. The light source can be a light bar or a light strip, or another type of light source that can illuminate a region. The light source can include LEDs, for example. The light source can include one, two, three, four, five, six, seven, eight, nine, or ten or more LEDs. The light source(s) can be powered independently of the power source of the vehicle to which they are attached. Alternatively, the light source(s) of the light mount 218 can be powered by connecting to a power source of the vehicle, such as the battery of a vehicle. In some embodiments, the light source(s) of the light mount 218 can be electronically coupled to a power source of the vehicle and can also have an independent power source which can act as a back-up power source and/or can be utilized if the vehicle power is disabled (e.g., the vehicle is off).

To facilitate electrical connection of the light source(s) to a power source of the vehicle, light mount 218 can have one or more openings configured to allow a power cable to pass therethrough. For example, the power cable can connect to the light source(s) within the light mount 218, pass through an opening in the light mount 218, pass through a hole in the vehicle (such as a hole in a hood of the vehicle) and connect to the battery of the vehicle. Such hole can be drilled into a hood or can be a pre-existing hole or opening in the hood as occurs in some vehicles, such as jeeps. Where the vehicle body shield 214 is attached to a roof of the vehicle, such hole can be on a portion of the roof under or nearby the opening of the light mounts 218 and a power cable can run from the light source through the roof and into the cab of the vehicle. In some embodiments, the light source of the light mount 218 can be configured to electronically couple to the parking lights of the vehicle.

The one or more openings in the light mount 218 can be located at a variety of locations. For example, where the light mount 218 includes one or more side flanges 239, a top flange 220, and/or a back face 224, the one or more openings (or pre-formed holes) can be positioned on a portion of any of these. As another example, some embodiments of the light mount 218 do not have a back face 224, and, in such embodiments, wiring connected to the light source(s) secured to the light mount 218 can be passed through an opening in the protection surface 228 where the back face 224 appears in FIG. 3B. As another example, some embodiments of the light mount 218 do not have side flanges 239, and, in such embodiments, wiring connected to the light source(s) secured to the light mount 218 can be passed through an opening in the protection surface 228 where such side flanges could be. As another example, some embodiments of the light mount 218 do not have a top flange 220, and, in such embodiments, electrical wiring connected to the light source(s) secured to the light mount 218 can be passed through an opening in the protection surface 228 where the top flange 220 appears in FIG. 3B. As another example, some embodiments of the light mount 218 include an opening on one or more of the side flanges 239 of light mount 218 (for example, in a surface of a side flange 239 that faces a direction parallel to a length of the light mount 218, the recess that can be defined by the light mount 218, and/or an opposing side flange 239 of the light mount 218). In such configurations, an electrical wire connected to the light source (such as an end of the light source) can pass through an opening in one of the side flanges 239 of light mount 218, pass under a portion of the vehicle body shield 214 and wrap under an edge of the hood 12, 112 of the vehicle, for example a leading edge of the hood 112. In some embodiments, the vehicle body shield 214 includes a lip that sticks out passed such edge of the hood 12, 112 and hides the portion of the wiring that wraps around and underneath the hood. Such electrical wire can be spliced into the parking or fog lights of the vehicle, for example. In some embodiments, the light mount 218 can be turned on and/or off with a toggle switch.

As discussed above, the light source(s) of light mount 218 can be powered independently of the power source of the vehicle to which they are attached. For example, the light source(s) secured to the light mount 218 can be connected to and powered by an independent power source, such as a battery. Such independent power source can be housed within a space 225 between the hood 12, 112 and the vehicle body shield 214 (see FIG. 3B).

As discussed above, the light mount 218 can extend upward from a portion of the vehicle body shield 214. For example, the light mount 218 can extend upward (such as vertically upward) from the attachment surface 230 and can extend between ends of the vehicle body shield 214. The light mount 218 can extend above the vehicle body shield 214 a maximum height so that the light mount 218 does not interfere with driver visibility of a region in front of the vehicle. For example, where the vehicle body shield 214 is mounted on a hood 12, 112, of a vehicle and a driver is positioned in the driver's seat, the driver will need to be able to see portions of the road in front of the vehicle when the vehicle is in motion. Keeping the height of the light mount 218 of the vehicle body shield 214 within a certain percentage of a distance between the hood 12, 112 and the driver' eye height can ensure that the light mount 218 does not interfere with such driver visibility. In some embodiments, the height of the light mount 218 above the hood 12, 112 is less than a certain percentage of a distance between the hood 12, 112 and a roof of the vehicle. For example, the height of the light mount 218 above the hood 12, 112 can be less than 30% of a distance between the hood 12, 112 and a roof of the vehicle. As another example, the height of the light mount 218 above the hood 12, 112 can be less than 25%, 20%, 15%, 10%, or 5% of a distance between the hood 12, 112 and a roof of the vehicle.

As shown in FIGS. 3A and 3C, the vehicle body shield 214 can have a first end 233 and a second end 232. Further, the light mount 218 can extend upward from the attachment surface 230 of the vehicle body shield 214 and can extend between the first end 233 and second end 232 of the vehicle body shield 214. The light mount 218 can extend along the vehicle body shield 214 a given length that is a certain percentage of a length of the vehicle body shield 214 between the first end 233 and second end 232. For example, the light mount 218 can extend along the vehicle body shield 214 a length that is at least 10%, 20%, 30%, 40%, 50%, 60%, or 70% of a length of the vehicle body shield 214 between the first end 233 and second end 232. As another example, the light mount 218 can extend along the vehicle body shield 214 a length that is no more than 30%, 40%, 50%, 60%, 70%, 80%, or 90% of a length of the vehicle body shield 214 between the first end 233 and second end 232. Greater extension of the light mount 218 along a length of the vehicle body shield 218 can allow larger size (e.g., length) light sources, which can in turn provide more illumination to regions in front and/or nearby the vehicle body shield 214.

As discussed above, the vehicle body shield 214 can be attached to a roof of a vehicle. When attached to the roof, the vehicle body shield 214 can cover and/or rest upon the roof and/or a portion of a windshield of the vehicle. For example, the vehicle body shield 214 can be secured to a leading portion of the roof and/or a trailing (upper) portion of a windshield using the adhesive and/or mechanical methods and/or techniques discussed herein and/or in U.S. Pat. No. 9,878,600. In some embodiments, when the vehicle body shield 214 is secured to a leading portion of the roof, a portion of the vehicle body shield 214 rests overtop, but does not adhere to, a trailing (upper) portion of the windshield. Other configurations and/or placement locations of the vehicle body shield 214 on a roof of a vehicle are contemplated by the disclosure.

In some embodiments, the vehicle body shield 214 further comprises an attachment clip configured to attach the vehicle body shield to a hood of the vehicle. Such attachment clips are described in U.S. Pat. No. 9,878,600, which is hereby incorporated by reference in its entirety.

Figure 4A:
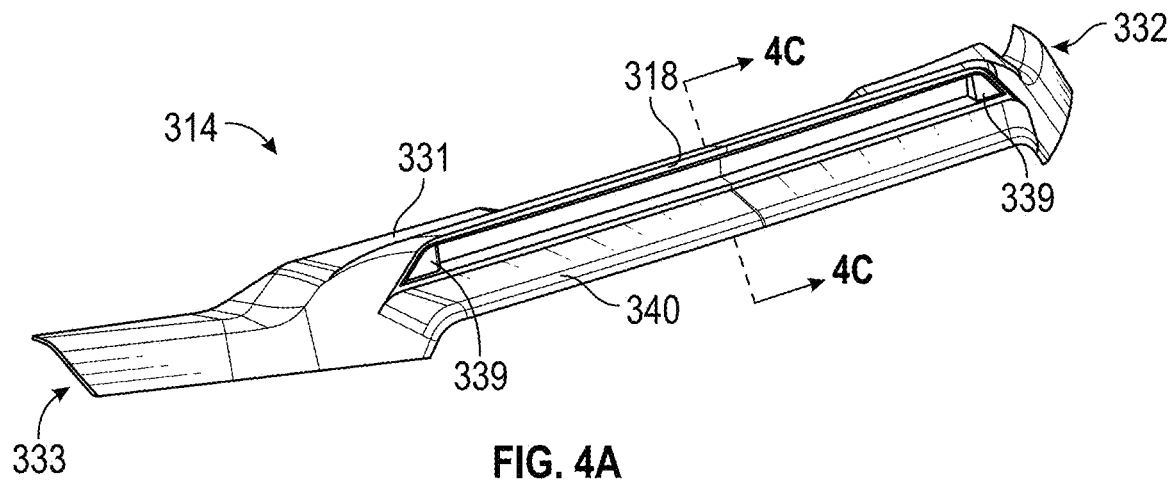
FIG. 4A illustrates a perspective view of another embodiment of a vehicle body shield.
Figure 4B:
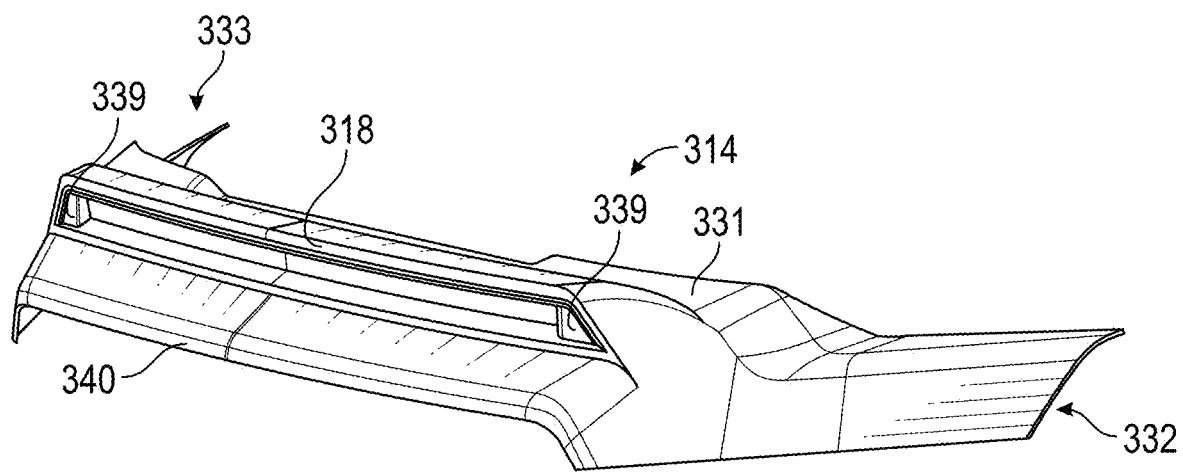
FIG. 4B illustrates another perspective view of the vehicle body shield of FIG. 4A.
Figure 4C:
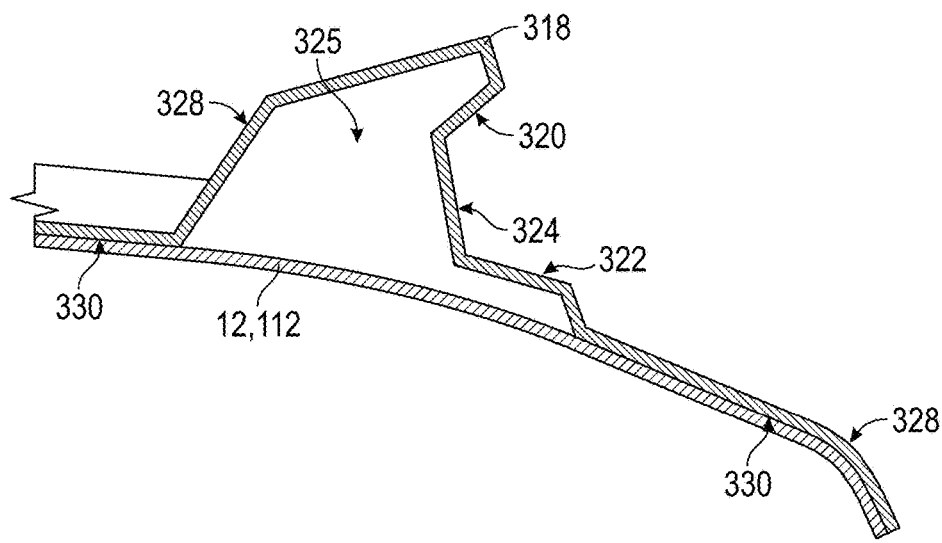
FIG. 4C illustrates a cross-section of the embodiment of the vehicle body shield of FIG. 4A.

FIGS. 4A-4C illustrate another embodiment of a vehicle body shield 314. Vehicle body shield 314 can be similar in some or many respects as vehicle body shields 14, 114, 214. FIGS. 4A and 4B illustrate front, angled perspective views of the vehicle body shield 314. Vehicle body shield 314 can be configured to attach to a hood of a vehicle, a roof of a vehicle, and/or another portion of a vehicle. The vehicle body shield 314 can have a main body including a protection surface 328 which faces away from the hood of the vehicle and an attachment surface 330 which faces toward the hood of a vehicle (see FIG. 4C). The vehicle body shield 314 can attach to a vehicle as shown and/or described in U.S. Pat. No. 9,878,600. For example, the attachment surface 330 can have one or more adhesive tape sections extending along a portion of the attachment surface 330 and configured to secure to a portion of the hood of a vehicle.

The vehicle body shield 314 can be attached to a front portion of the hood of a vehicle and can partially wrap around a leading edge of the hood. For example, a front portion 340 of vehicle body shield 314 can wrap around a leading edge of a hood. The vehicle body shield 314 can have arms or side portions located at ends 333, 332 which extend over sides and/or the front portion of a vehicle (see FIGS. 4A-4B). Similar to as that discussed with respect to the vehicle body shields 14, 114, 214, the vehicle body shield 314 can be sized and/or shaped to conform to the shape of various portions of vehicles, such as hoods or roofs of vehicles.

Figure 4D:
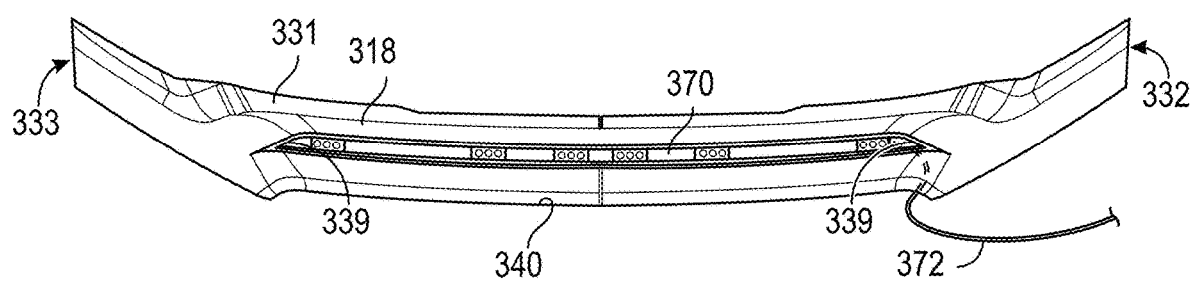
FIG. 4D illustrates a front perspective view of the vehicle body shield of FIG. 4A and a light strip secured to a light mount of the vehicle body shield in accordance with aspects of this disclosure.

Vehicle body shield 314 can be configured to form a light mount 318, as shown in at least FIGS. 4A-4B. Light mount 318 can extend from a portion of the attachment surface 330 and can extend between first and second ends 333, 332 of the vehicle body shield 314. As discussed herein, the light mount 318 can define a mounting space for a light source (such as light strip 370 as shown in FIG. 4D) which can illuminate a region nearby the vehicle, such as in front of the vehicle. The mounting space defined by the light mount 318 can be of a variety of different forms and/or configurations in order to receive and/or secure light sources. Further, light mount 318 can be located in various regions of the vehicle body shield 314. As shown by FIGS. 4A-4B, the light mount 318 can be spaced inward from a front portion 340 of the vehicle body shield 314 and/or can be spaced inward from a back portion 331 of the vehicle body shield 314.

FIG. 4C illustrates a cross-section of the light mount 318. As shown, the light mount 318 can take various forms so as to receive and/or secure one or more light sources. In some cases, the light mount 318 is sized and/or shaped to receive a light strip (such as light strip 370 as shown in FIG. 4D) which can be secured (e.g., adhered) to a portion of the light mount 318 (e.g., the back face 324) and which is configured to illuminate nearby areas. The light mount 118 can include a top flange 320 and/or a bottom flange 322 which can secure sides of the light source (e.g., where the light source is a light bar). Additionally or alternatively, the light mount 318 can include a pair of side flanges 339 (see FIGS. 4A-4B) positioned near ends of the light mount 318 which can secure ends of the light source. Such side flanges 339 can be oriented so that they are transverse (e.g., perpendicular) to the top flange 320 and/or bottom flange 322 as shown in FIG. 4C. Such side flanges 339 can be oriented so that surfaces of the ends of the light source are generally parallel with planes of the side flanges 339. In some embodiments, the light mount 318 includes a back face 324 configured to secure a side of the light source. The back face 324 can be spaced rearward from the surrounding protection surface 328. For example, the back face 324 can be recessed from the surrounding protection surface 328. In some cases, the top flange 320 and/or the bottom flange 322 are transverse with respect to the back face 324 (see FIG. 4C). In some cases, the top flange 320 and/or the bottom flange 322 are perpendicular with respect to the back face 324.

As discussed above, FIG. 4C illustrates a cross-section of the vehicle body shield 314 through the light mount 318. As shown in FIG. 4C, the vehicle body shield 314 can be attached to a hood of a vehicle via attachment surface(s) 330. The protection surface 328 of the vehicle body shield 314 is also illustrated in FIG. 4C. In some embodiments, the attachment surface 330 and/or the protection surface 328 of the vehicle body shield 314 are sized and/or shaped to conform to the surface of a hood 12, 112 or other portion of the vehicle to which they are attached.

As discussed herein, a light source (or a plurality of light sources) can be secured to and/or within the light mount 318. The light source can be a light bar or a light strip (such as light strip 370), or another type of light source that can illuminate a region. The light source can include LEDs, for example. The light source can include one, two, three, four, five, six, seven, eight, nine, or ten or more LEDs. The light source(s) can be powered independently of the power source of the vehicle to which they are attached. Alternatively, the light source(s) of the light mount 318 can be powered by connecting to a power source of the vehicle, such as the battery of a vehicle. In some embodiments, the light source(s) of the light mount 318 can be electronically coupled to a power source of the vehicle and can also have an independent power source which can act as a back-up power source and/or can be utilized if the vehicle power is disabled (e.g., the vehicle is off).

To facilitate electrical connection of the light source(s) to a power source of the vehicle, light mount 318 can have one or more openings configured to allow a power cable to pass therethrough. For example, the power cable can connect to the light source(s) within the light mount 318, pass through an opening in the light mount 318, pass through a hole in the vehicle (such as a hole in a hood of the vehicle) and connect to the battery of the vehicle. Such hole can be drilled into a hood or can be a pre-existing hole or opening in the hood as occurs in some vehicles, such as jeeps. Where the vehicle body shield 314 is attached to a roof of the vehicle, such hole can be on a portion of the roof under or nearby the opening of the light mounts 318 and a power cable can run from the light source through the roof and into the cab of the vehicle. In some embodiments, the light source of the light mount 318 can be configured to electronically couple to the parking lights of the vehicle.

The one or more openings in the light mount 318 can be located at a variety of locations. For example, where the light mount 318 includes one or more side flanges 339, a top flange 320, a bottom flange 322, and/or a back face 324, the one or more openings (or pre-formed holes) can be positioned on a portion of any of these. As another example, some embodiments of the light mount 318 do not have a back face 324, and, in such embodiments, wiring connected to the light source(s) secured to the light mount 318 can be passed through an opening in the protection surface 328 where the back face 324 appears in FIG. 4C. As another example, some embodiments of the light mount 318 do not have side flanges 339, and, in such embodiments, wiring connected to the light source(s) secured to the light mount 318 can be passed through an opening in the protection surface 328 where such side flanges 339 could be. As another example, some embodiments of the light mount 318 do not have a top flange 320, and, in such embodiments, electrical wiring connected to the light source(s) secured to the light mount 318 can be passed through an opening in the protection surface 328 where the top flange 320 appears in FIG. 4C. As another example, some embodiments of the light mount 318 include an opening on one or more of the side flanges 339 of light mount 318 (for example, in a surface of a side flange 339 that faces a direction parallel to a length of the light mount 318, the recess that can be defined by the light mount 318, and/or an opposing side flange 339 of the light mount 318). In such configurations, an electrical wire connected to the light source (such as an end of the light source) can pass through an opening in one of the side flanges 339 of light mount 318, pass under a portion of the vehicle body shield 314 and wrap under an edge of the hood 12, 112 of the vehicle, for example a leading edge of the hood 112. In some embodiments, the vehicle body shield 314 includes a lip that sticks out passed such edge of the hood 12, 112 and hides the portion of the wiring that wraps around and underneath the hood. Such electrical wire can be spliced into the parking or fog lights of the vehicle, for example. In some embodiments, the light mount 318 can be turned on and/or off with a toggle switch.

As discussed above, the light source(s) of light mount 318 can be powered independently of the power source of the vehicle to which they are attached. For example, the light source(s) secured to the light mount 318 can be connected to and powered by an independent power source, such as a battery. Such independent power source can be housed within a space 325 between the hood 12, 112 and the vehicle body shield 314 (see FIG. 4C).

As discussed above, the light mount 318 can extend upward from a portion of the vehicle body shield 314. For example, the light mount 318 can extend upward (such as vertically upward) from the attachment surface 330 and can extend between ends of the vehicle body shield 314. The light mount 318 can extend above the vehicle body shield 314 a maximum height so that the light mount 318 does not interfere with driver visibility of a region in front of the vehicle. For example, where the vehicle body shield 314 is mounted on a hood 12, 112, of a vehicle and a driver is positioned in the driver's seat, the driver will need to be able to see portions of the road in front of the vehicle when the vehicle is in motion. Keeping the height of the light mount 318 of the vehicle body shield 314 within a certain percentage of a distance between the hood 12, 112 and the driver' eye height can ensure that the light mount 318 does not interfere with such driver visibility. In some embodiments, the height of the light mount 318 above the hood 12, 112 is less than a certain percentage of a distance between the hood 12, 112 and a roof of the vehicle. For example, the height of the light mount 318 above the hood 12, 112 can be less than 30% of a distance between the hood 12, 112 and a roof of the vehicle. As another example, the height of the light mount 318 above the hood 12, 112 can be less than 25%, 20%, 15%, 10%, or 5% of a distance between the hood 12, 112 and a roof of the vehicle.

As shown in FIG. 4A-4B, the vehicle body shield 314 can have a first end 333 and a second end 332. Further, the light mount 318 can extend upward from the attachment surface 330 of the vehicle body shield 314 and can extend between the first end 333 and second end 332 of the vehicle body shield 314. The light mount 318 can extend along the vehicle body shield 314 a given length that is a certain percentage of a length of the vehicle body shield 314 between the first end 333 and second end 332. For example, the light mount 318 can extend along the vehicle body shield 314 a length that is at least 10%, 20%, 30%, 40%, 50%, 60%, or 70% of a length of the vehicle body shield 314 between the first end 333 and second end 332. As another example, the light mount 318 can extend along the vehicle body shield 314 a length that is no more than 30%, 40%, 50%, 60%, 70%, 80%, or 90% of a length of the vehicle body shield 314 between the first end 333 and second end 332. Greater extension of the light mount 318 along a length of the vehicle body shield 318 can allow larger size (e.g., length) light sources, which can in turn provide more illumination to regions in front and/or nearby the vehicle body shield 314.

As discussed above, the vehicle body shield 314 can be attached to a roof of a vehicle. When attached to the roof, the vehicle body shield 314 can cover and/or rest upon the roof and/or a portion of a windshield of the vehicle. For example, the vehicle body shield 314 can be secured to a leading portion of the roof and/or a trailing (upper) portion of a windshield using the adhesive and/or mechanical methods and/or techniques discussed herein and/or in U.S. Pat. No. 9,878,600. In some embodiments, when the vehicle body shield 314 is secured to a leading portion of the roof, a portion of the vehicle body shield 314 rests overtop, but does not adhere to, a trailing (upper) portion of the windshield. Other configurations and/or placement locations of the vehicle body shield 314 on a roof of a vehicle are contemplated by the disclosure.

In some embodiments, the vehicle body shield 314 further comprises an attachment clip configured to attach the vehicle body shield to a hood of the vehicle. Such attachment clips are described in U.S. Pat. No. 9,878,600, which is hereby incorporated by reference in its entirety.

FIG. 4D illustrates a front view of the vehicle body shield 314 of FIGS. 4A-4C and further illustrates a light strip 370 secured within the light mount 318 of vehicle body shield 314. Light strip 370 can have one or more LEDs along a front surface of the light strip 370. For example, light strip 370 can have one or more, two or more, three or more, four or more, five or more, six or more, seven or more, eight or more, nine or more, or ten or more LEDs positioned along a front surface of the light strip 370. In some embodiments, light strip 370 includes one or more groups of LEDs positioned along the front surface of the light strip 370 and/or spaced from one another. For example, the light strip 370 can include one or more, two or more, three or more, four or more, or six or more groups of LEDs positioned along the front surface of the light strip 370 and spaced away from one another. Light strip 370 can have a back surface configured to secure to the back face 324 of the light mount 318. For example, the back surface of the light strip 370 (which can be opposite the front surface of the light strip 370) can include an adhesive section or sections which can adhere to the back face 324 of light mount 318. Where the light strip 370 includes an adhesive back surface, light strip 370 can include a removable release liner that covers the adhesive back surface prior to installation onto back face 324 of light mount 318. As shown in FIG. 4D, an electrical wire 372 can be connected to an end of light strip 370. Further, as discussed above, vehicle body shield 314 can include one or more openings sized and/or shaped to allow the electrical wire 372 to pass through and connect to, for example, a power source of the vehicle to which the vehicle body shield 314 is attached. For example, as shown in FIG. 4D, a side flange 339 of the light mount 318 of the vehicle body shield 314 can have an opening configured to permit wire 372 to pass therethrough and/or underneath a portion of the vehicle body shield 314 and above a hood of a vehicle to which the vehicle body shield 314 is attached. A portion of the wire 372 that is underneath the vehicle body shield 314 is shown in dotted line in FIG. 4D. As discussed elsewhere herein, wire 372 can connect to light strip 370 (or a different light source used with vehicle body shield 314) pass underneath a portion of vehicle body shield 314 (such as a front portion), wrap around a leading edge of a hood of a vehicle to which the vehicle body shield 314 is attached, and can be attached and/or routed along an underside of the hood of the vehicle to connect to a power source of the vehicle (such as the vehicle running lights).

From the foregoing description, it will be appreciated that an inventive vehicle body shield is disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A vehicle body shield for use on a hood of a vehicle, the vehicle body shield comprising:
   a first end and a second end opposite the first end, wherein the first and second ends are configured to be positioned at opposite sides of the hood of the vehicle when the vehicle body shield is secured to the hood in use;
   a leading edge and a trailing edge spaced from the leading edge, wherein the leading edge is configured to extend along a front edge of the hood of the vehicle when the vehicle body shield is secured to the hood in use;
   a protection surface configured to face away from the hood of the vehicle when the vehicle body shield is secured to the hood in use;
   an attachment surface configured to face towards the hood of the vehicle when the vehicle body shield is secured to the hood in use;
   a plurality of adhesive tape sections extending along the attachment surface and configured to secure to the hood of the vehicle; and
   a light mount extending upward from the hood of the vehicle when the vehicle body shield is secured to the hood, the light mount for operably positioning a light source configured to illuminate a region in front of the vehicle when in use, wherein the light mount is positioned between and spaced inward from the leading and trailing edges and is spaced inward from the first and second ends of the vehicle body shield, the light mount comprising:
   a pair of side flanges;
   a top flange and a bottom flange opposite the top flange, the top and bottom flanges oriented transverse relative to the pair of side flanges;
   a back face oriented transverse relative to the top and bottom flanges and oriented generally perpendicular relative to the pair of side flanges; and
   an opening extending through a portion of the light mount and configured to allow an electrical wire connected to the light source to pass therethrough, the electrical wire configured to electrically connect the light source to a power source of the vehicle.

2. The vehicle body shield of claim 1, further comprising said light source, wherein said light source comprises a plurality of LEDs.

3. The vehicle body shield of claim 2, wherein said light source is configured to adhesively secure to the back face of the light mount.

4. The vehicle body shield of claim 2, wherein the electrical wire is configured to electrically connect the light source to parking or fog lights of the vehicle.

5. The vehicle body shield of claim 1, wherein the leading edge is configured to cover the front edge of the hood of the vehicle when the vehicle body shield is secured to the hood in use.

6. The vehicle body shield of claim 1, wherein said opening is positioned at a location where the back face joins one of said pair of side flanges.

7. A vehicle body shield for use on a hood of a vehicle, the vehicle body shield comprising:
   a first end and a second end opposite the first end, wherein the first and second ends are configured to be positioned at opposite sides of the hood of the vehicle when the vehicle body shield is secured to the hood in use;
   a leading edge and a trailing edge spaced from the leading edge, wherein the leading edge is configured to extend along a front edge of the hood of the vehicle when the vehicle body shield is secured to the hood in use;
   a protection surface configured to face away from the hood of the vehicle when the vehicle body shield is secured to the hood in use;
   an attachment surface configured to face towards the hood of the vehicle when the vehicle body shield is secured to the hood in use;
   a plurality of adhesive tape sections extending along the attachment surface and configured to secure to the hood of the vehicle; and
   a light mount extending upward from the hood of the vehicle when the vehicle body shield is secured to the hood, the light mount defining a cavity configured to receive a light source for illuminating a region in front of the vehicle when in use, wherein the light mount is positioned between and spaced inward from the leading and trailing edges and is spaced inward from the first and second ends of the vehicle body shield.

8. The vehicle body shield of claim 7, wherein the cavity is at least partially formed by a pair of side flanges, a top flange, a bottom flange, and a back face, and wherein the back face is configured to provide a mounting surface to secure the light source.

9. The vehicle body shield of claim 8, wherein the top and bottom flanges are oriented transverse relative to the pair of side flanges, and wherein the back face is oriented transverse relative to the top and bottom flanges.

10. The vehicle body shield of claim 8, further comprising an opening extending through a portion of the light mount within said cavity, the opening configured to allow an electrical wire connected to the light source to pass therethrough to electrically connect the light source to a power source of the vehicle.

11. The vehicle body shield of claim 10, wherein said opening is positioned at a location where the back face joins one of said pair of side flanges.

12. The vehicle body shield of claim 7, further comprising said light source, wherein said light source comprises a plurality of LEDs.

13. The vehicle body shield of claim 12, wherein said light source is configured to adhesively secure to a portion of the light mount within said cavity.

14. The vehicle body shield of claim 7, wherein the leading edge is configured to cover the front edge of the hood of the vehicle when the vehicle body shield is secured to the hood in use.

15. A vehicle body shield for use on a hood of a vehicle, the vehicle body shield comprising:
- a leading edge and a trailing edge spaced from the leading edge, wherein the leading edge is configured to extend along a front edge of the hood of the vehicle when the vehicle body shield is secured to the hood in use;
- a protection surface configured to face away from the hood of the vehicle when the vehicle body shield is secured to the hood in use;
- an attachment surface configured to face towards the hood of the vehicle when the vehicle body shield is secured to the hood in use; and
- a light mount extending upward from the hood of the vehicle when the vehicle body shield is secured to the hood, the light mount defining a cavity configured to receive a light source for illuminating a region in front of the vehicle when in use, wherein the light mount is positioned between and spaced inward from the leading and trailing edges.

16. The vehicle body shield of claim 15, wherein the leading edge is configured to cover the front edge of the hood of the vehicle when the vehicle body shield is secured to the hood in use.

17. The vehicle body shield of claim 15, wherein the cavity is formed by a pair of side flanges, a top flange, a bottom flange, and a back face, and wherein the back face is configured to provide a mounting surface to secure the light source.

18. The vehicle body shield of claim 17, further comprising said light source, wherein said light source is configured to adhesively secure to the back face of the light mount.

19. The vehicle body shield of claim 17, further comprising an opening extending through a portion of the light mount within said cavity, the opening configured to allow an electrical wire connected to the light source to pass therethrough to electrically connect the light source to a power source of the vehicle.

20. The vehicle body shield of claim 19, wherein said opening is positioned at a location where the back face joins one of said pair of side flanges.

\* \* \* \* \*